United States Patent [19]

Boucher et al.

[11] Patent Number: 5,407,342

[45] Date of Patent: Apr. 18, 1995

[54] APPARATUS FOR MANUFACTURING A COMPOSITE PRODUCT

[76] Inventors: Paul Y. Boucher, 220 Elmgrove, Tecumseh, Ontario, Canada, N8N 3S3; David J. Koscic, 425 Gauthier, Tecumseh, Ontario, Canada, N8N 2W3; John R. Ford, 270 Woodbridge Drive, Tecumseh, Ontario, Canada, N8N 3A4

[21] Appl. No.: 119,301

[22] Filed: Sep. 13, 1993

[51] Int. Cl.⁶ ............................................. B29C 45/77
[52] U.S. Cl. .................................. 425/145; 425/450.1; 425/451.9; 425/589; 425/590; 425/595
[58] Field of Search ............... 425/145, 146, 564, 595, 425/589, 590, 450.1, 451.9

[56] References Cited

U.S. PATENT DOCUMENTS

| | | | |
|---|---|---|---|
| 3,737,278 | 6/1973 | Putzler | 425/450 |
| 4,030,186 | 6/1977 | Myers et al. | 29/427 |
| 4,125,490 | 11/1978 | Hettinga | 521/51 |
| 4,146,601 | 3/1979 | Bishop | 264/40.1 |
| 4,161,380 | 7/1979 | Bishop | 425/145 |
| 4,307,057 | 12/1981 | Hettinga | 264/328.8 |
| 4,376,625 | 3/1983 | Eckardt | 425/564 |
| 4,397,806 | 8/1983 | Hettinga | 264/328.1 |
| 4,613,475 | 9/1986 | Hettinga | 264/328.1 |
| 4,743,323 | 5/1988 | Hettinga | 156/60 |
| 4,816,197 | 3/1989 | Nunn | 264/40.6 |
| 4,850,217 | 7/1989 | Nunn | 73/56 |
| 4,931,236 | 6/1990 | Hettinga | 264/41 |
| 5,018,961 | 5/1991 | Miese et al. | 425/450.1 |
| 5,047,183 | 9/1991 | Eckardt et al. | 264/40.3 |
| 5,078,586 | 1/1992 | Hettinga | 425/192 R |
| 5,106,283 | 4/1992 | Sauer et al. | 425/130 |
| 5,110,532 | 5/1992 | Hettinga | 264/257 |
| 5,139,714 | 8/1992 | Hettinga | 264/45.1 |
| 5,149,547 | 9/1992 | Gill | 425/145 |
| 5,151,237 | 9/1992 | Hettinga | 264/257 |
| 5,169,648 | 12/1992 | Eckardt et al. | 425/130 |
| 5,223,275 | 6/1993 | Gellert | 425/564 |

FOREIGN PATENT DOCUMENTS 2076161 4/1993 Canada .
2076162 4/1993 Canada .

OTHER PUBLICATIONS

Camac, Cincinnati Milacron Mar. 1984.

*Primary Examiner*—Tim Heitbrink
*Attorney, Agent, or Firm*—Jeffrey T. Imai; D. Doak Horne; Arne I. Fors

[57] ABSTRACT

An apparatus for injection molding plastics material has an injection unit for delivering a plasticized melt through a nozzle, a press unit for urging a mold together at a predetermined pressure, a mold mounted in the press unit and a programmable controller operably connected to the injection unit and the press unit for automatically controlling the operation of the apparatus for repetitively producing uniform articles. The mold has a stationary mold section and a moveable mold section. The press unit is adapted for reciprocating the moveable mold section between an open position and a closed position. The stationary mold section has a plurality of ports at pre-selected points. Each port has a controllable gate for selectively opening and closing the ports for passing melt to a mold cavity until the melt fully occupies the mold cavity while controlling and minimizing melt lines formed when a flow of melt from one of the ports meets with a flow of melt from another of the ports.

19 Claims, 12 Drawing Sheets

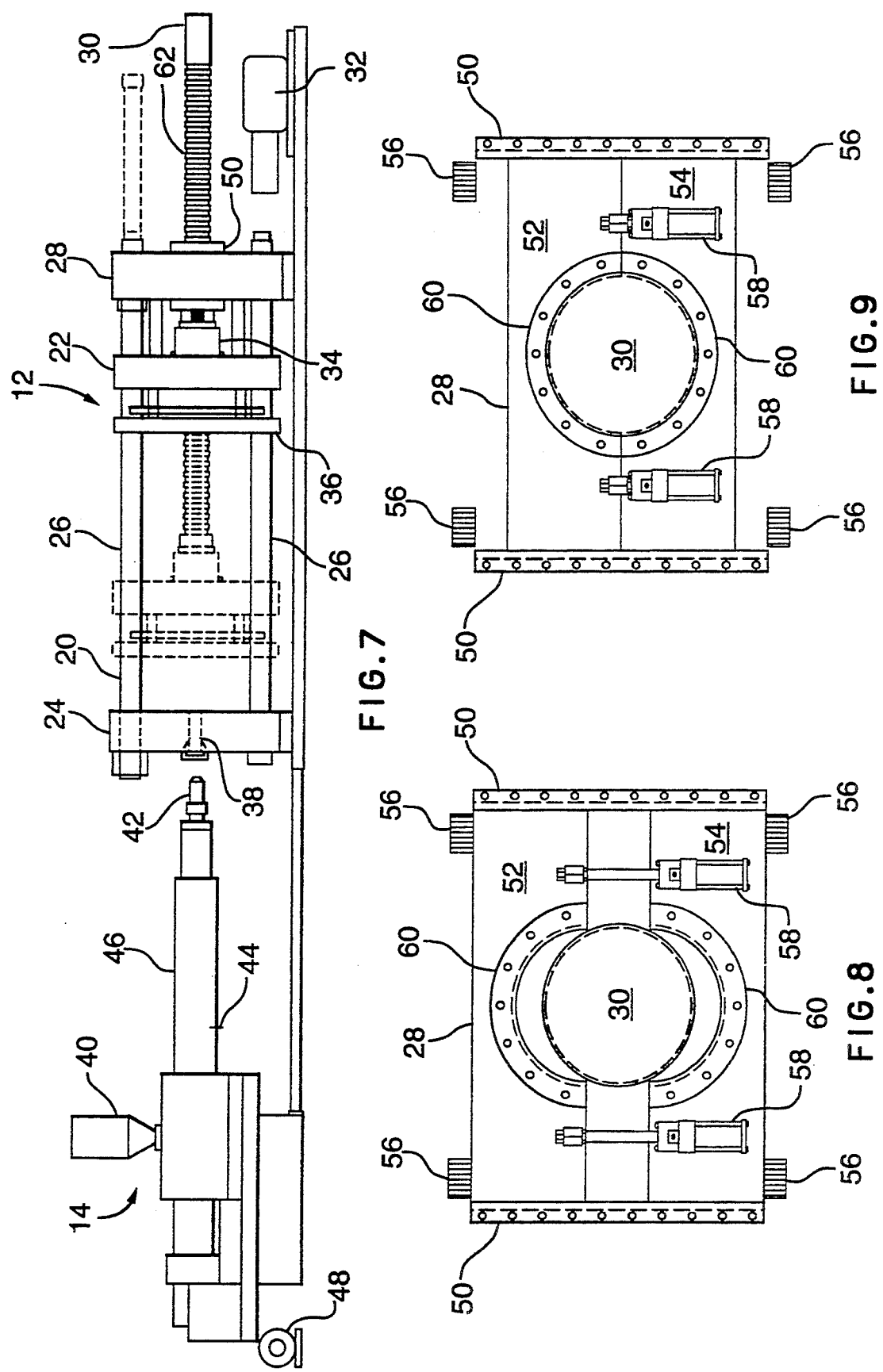

and low-pressure molding apparatus. The reduced pressures on injection reduces pressure differences within the molded part. Pressure differential affects the shrinkage. In a typical high pressure injection, the gate pressure can be about 20,000 psi and a cavity pressure at end-of-fill can be about 18,000 psi. In contrast, low-pressure molding experiences an injection pressure of 6,000 psi and an end-of-fill pressure of 5,000 psi.

APPARATUS FOR MANUFACTURING A COMPOSITE PRODUCT

FIELD OF INVENTION

This invention relates to an apparatus for manufacturing a composite thermoset product. In particular, this invention relates to an apparatus for manufacturing composite thermoset products for use as automobile door liners.

BACKGROUND OF THE INVENTION

Interior door liners and other components for automobiles are manufactured using an injection molding process. Thermoset material can be injection molded to a rigid part and then subsequently a textured interior surfacing material is attached to give the liner a textured surface. However, such process is time consuming and difficult to maintain adequate quality controls to be economical.

It is possible to mold the thermoset material directly to the textured surface. U.S. Pat. Nos. 5,110,532 and 5,151,237 disclose methods of injection molding a flat deformable laminate material. Thermoset resin is injected into a chamber through a single gate and then about a deformable material onto a soft porous material to form a unitary laminate bonded together by the thermoset material. The laminate can then be heated deforming the thermoset material to a desired shape.

In U.S. Pat. No. 4,743,323, another method of injection molding a composite article is disclosed. Fabric material is placed within the molding cavity and maintained under tension during the molding operation. Thermoset material is injected through a single gate, through a multiple port header into the molding cavity from opposite ends thereof.

The prior art processes generally utilize a relatively high pressure machine to undertake the injection process. The full tonnage of the machine is used for each injection cycle to maintain the mold sections together. As well, maximum pressure is used for injecting the thermoset material into the mold. Maximum pressures are required to ensure that the cavity becomes fully filled with the thermoset material. However, the use of maximum pressures is inefficient and tends to reduce the operational lifespan of the machine.

Apparatus of the prior art generally have a stationary mold section and a moveable mold section secured to a base plate that is movably supported on slide or guide rods in response to the operation of a hydraulic cylinder mounted on a ram. The ram passes through the base whereupon a disc swings to cover the opening of the base plate providing a foundation for the ram. The hydraulic cylinder extends urging the mold sections together. The useful travel of the hydraulic cylinder is very limited thus limiting the depth of a mold which can be used and ultimately the size of the part which can be molded. Such apparatus are commercially available under the trademark BATTENFELD.

Apparatus of the prior art generally undertake a single injection of melt into a mold cavity. For simple molded shapes, a single gate produces adequate results. However, for more complicated shapes, multiple controlled gates must be used in order to ensure that the melt fully occupies the mold cavity. Higher injection pressures are used to ensure complete injection. Higher injection pressure necessitates higher press pressure to maintain the mold sections together containing the injected material.

Recently, controlled low-pressure molding has been recognized as a viable technology. In controlled low-pressure molding, a fully plasticized and uniform melt is injected into a mold cavity while speed and injection pressure are controlled to assure that the melt front or leading edge remains intact throughout the filling process. This process eliminates the need for packing out the product reducing the material used and molded-in stresses. Controlled low-pressure molding permits a melt temperature which is lower than conventional high speed and high pressure molding. Further, larger gates with positive displacement shut off valves are used to minimize frictional heat and shear in the melt.

The reduced pressures on injection reduces the pressure differentials within the molded part. Pressure differential affects the shrinkage. In a typical high pressure injection, the gate pressure can be about 20,000 psi and a cavity pressure at end-of-fill can be about 18,000 psi. In contrast, low-pressure molding experiences an injection pressure of 6,000 psi and an end-of-fill pressure of 5,000 psi.

Low-pressure molding provides a method for producing more complicated parts using a single injection process. However, new machinery to replace existing high pressure apparatus is expensive. Although high pressure apparatus can be retrofitted to operate as a low-pressure molding apparatus, without extensive rebuilding, the high pressure machines cannot accommodate larger mold sections used for molding complicated parts.

SUMMARY OF THE INVENTION

The disadvantages of the prior art may be overcome by providing a molding apparatus having an improved travel for accommodating large sized mold sections incorporating controllable gates for regulating the flow of melt into a mold cavity.

It is desirable to provide an apparatus having a controller for controlling the volume of melt into a mold cavity.

It is further desirable to provide a mold section having controlled gates for regulating the flow of melt into the mold cavity.

It is further desirable to provide the controller and the mold section as a unit for retrofitting existing injection molding apparatus.

According to one aspect of the invention, there is provided an apparatus for injection molding plastics material comprising an injection unit for delivering a plasticized melt through a nozzle, a press unit for urging a mold together at a predetermined pressure, a mold mounted in the press unit and a programmable controller operably connected to the injection unit and the press unit for automatically controlling the operation of the apparatus for repetitively producing uniform articles. The mold comprises a stationary mold section and a moveable mold section. The press unit is adapted for reciprocating the moveable mold section between an open position and a closed position. The stationary mold section has a plurality of ports at preselected points. Each port has a controllable gate for selectively opening and closing the ports for passing melt to a mold cavity until the melt fully occupies the mold cavity while controlling and minimizing melt lines formed when a flow of melt from one of the ports meets with a flow of melt from another of the ports.

According to another aspect of the invention, the press unit comprises an elongated stationary frame having an end plate and a base plate and slide rods extending therebetween. The end plate has a stationary mold section mounted thereon and at least one orifice adapted to sealingly receive the nozzle and communicate with the inlet of the stationary mold section. A moveable frame is slidably mounted on the slide rods for reciprocal movement between the end plate and the base plate. The moveable frame has a first drive mounted between the base plate and the moveable plate for effecting the reciprocal movement therebetween. A base mold section is slidably mounted on the slide rods for reciprocal movement between the end plate and the moveable frame. The base mold section has a moveable mold section mounted thereon. The base mold section has a second drive mounted between the moveable frame and the base mold section for effecting the reciprocal movement therebetween. The base mold section has a plurality of locking bars adapted to engage the moveable frame and the moveable frame has a locking mechanism for releasably securing the locking bars when the moveable mold section is in the closed position. One of the drives positions the moveable mold section in the closed position and the other drive means urges the mold sections together at a predetermined pressure.

According to another aspect of the invention, the locking mechanism comprises a first and second locking member slidably mounted on the face of the moveable frame. The first and second locking members are adapted to cooperatively engage the locking bars. An actuator is connected between the first and second locking members for sliding the members relative to each other opening and closing the locking members.

According to yet another aspect of the invention, a programmable controller comprises a first sensors mounted in the injection unit for generating a first signal proportional the volume of the plasticized melt being delivered, a plurality of second sensors for generating a plurality of second signals. Each second sensor is mounted in each of the controllable gates. Each second signal is proportional to a degree of opening of the respective controllable gate. The programmable controller is responsive to the first and second signals and operably connected to the controllable gates for opening and closing the ports at a predetermined sequence.

According to yet another aspect of the invention, the press unit further comprises a fourth drive operably connected to one of the slide bars. This slide bar is releasably secured to the end plate and base plate, whereupon releasing this slide bar, the fourth drive retracts this slide bar for accessing an area where the mold is mountable in the press unit.

According to another aspect of the invention, there is provided an apparatus for injection molding plastics material. The apparatus comprises an injection unit for heating a plastic material to a plasticized melt and for pressuring the melt to flow through a nozzle. The injection unit has a first drive for moving the unit, a displacement sensor for sensing the movement of the unit and generating a signal proportional thereto and a sensor for sensing pressure of the melt and generating a signal proportional thereto. The apparatus also has a press unit comprising an elongated stationary frame having an inlet end plate and a base plate and slide rods extending therebetween. The inlet end plate has at least one inlet orifice adapted to sealingly receive the nozzle. The base plate has a bore. A moveable frame is slidably mounted on the slide rods for reciprocal movement between the end plates between an open position and a closed position. A first mold section is mounted on the stationary frame and a second mold section is mounted on the moveable frame. The first and second mold section are complementarily fitting to define a mold cavity when the moveable frame is in a closed position. The first mold section has a plurality of gates, each communicating between the inlet orifice and the mold cavity. The moveable frame has a jack mounted thereon and a ram mounted on the jack. The jack and ram are adapted to extend through the bore of the base plate. A locking mechanism locks the ram when the moveable frame is in the closed position. The ram has a displacement sensor for sensing the displacement of the ram relative to the base plate and for generating a signal proportional thereto. A second drive effects the reciprocal movement. The apparatus further includes a controller for controlling the operation of the apparatus. The controller is operably connected to the drives, the displacement sensors, the jack and the injection unit. The controller is programmable for periodically moving the moveable plate to the closed position, locking the ram for locking the moveable plate in the closed position, energizing the jack urging the first and second mold sections together at a predetermined pressure, injecting a predetermined amount of melt into the mold cavity at a predetermined pressure, waiting a predetermined time period, de-energizing the jack, unlocking the locking mechanism, moving the moveable plate to the open position. Each of the gates of the first mold section have a valve for controlling the volume of melt through the gate. The valve is responsive to the controller. The controller sequentially opens and closes the valves responsive to the gate signals as the melt fully occupies the mold cavity.

According to another aspect of the invention, a press is provided wherein the ram has a series of circumferentially extending ridges, and a locking mechanism having a first and second locking member slidably mounted on the base plate. The first and second locking members are adapted to cooperatively engage the ram between adjacent ridges. An actuator is connected between the first and second locking members for sliding the members relative to each other opening and closing the locking mechanism.

DESCRIPTION OF THE DRAWINGS

In figures which illustrate embodiments of the invention,

FIG. 7 is a side elevational view of a third embodiment of the apparatus of the present invention;

FIG. 8 is an end elevational view of the clamping device of the apparatus of FIG. 6, the clamping device in an open condition;

FIG. 9 is an end elevational view of the clamping device of the apparatus of FIG. 5, the clamping device in a closed condition;

DETAILED DESCRIPTION OF THE INVENTION

Figure 1A:
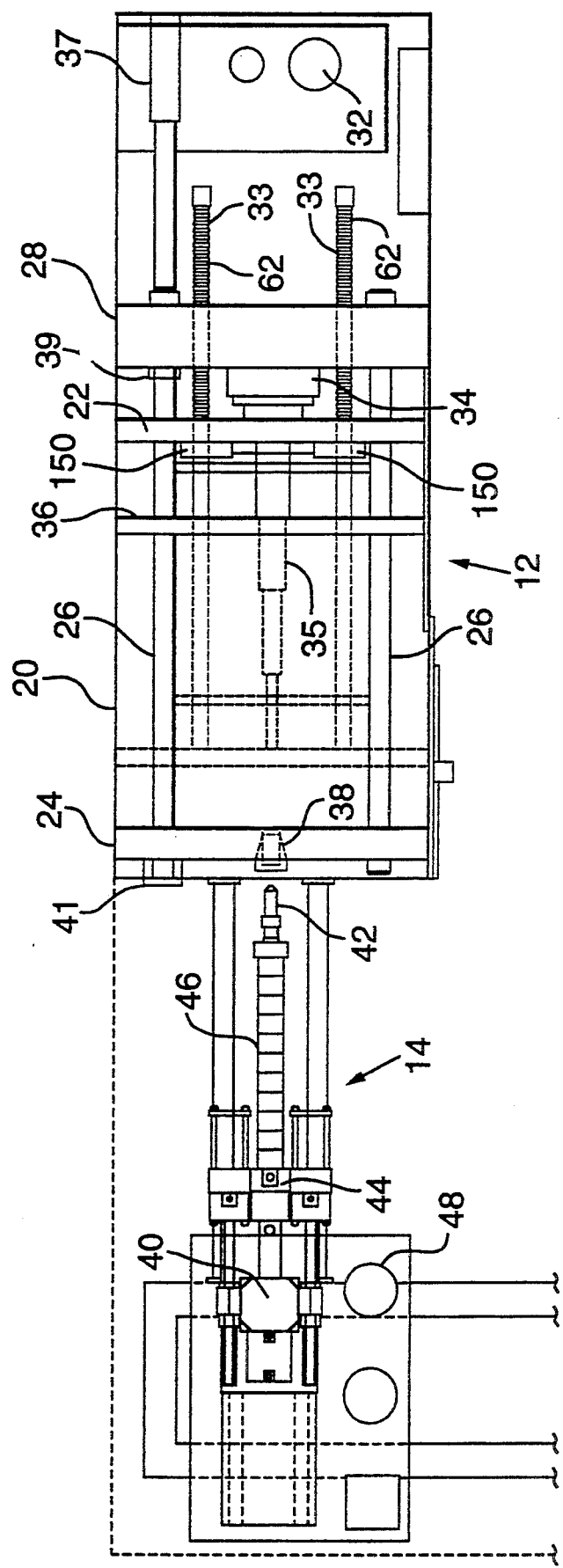
FIG. 1 is a top plan view a first embodiment of the apparatus of the present invention.
Figure 1B:
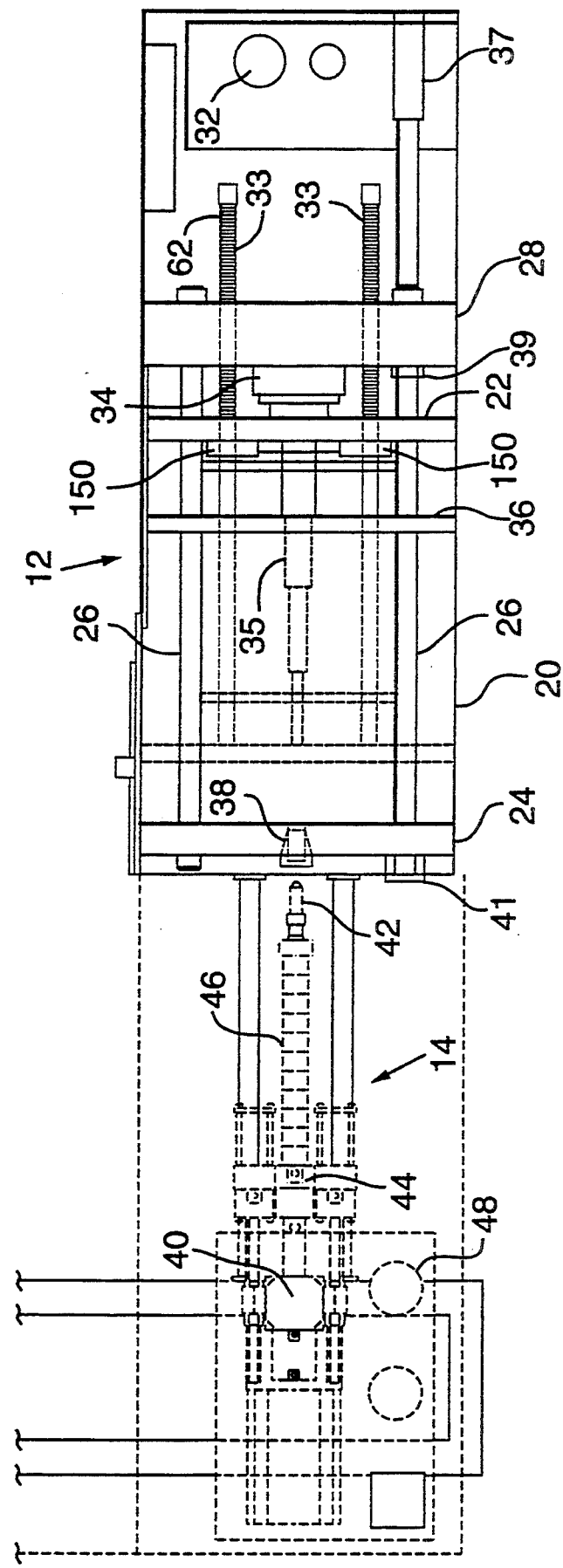
Figure 2:
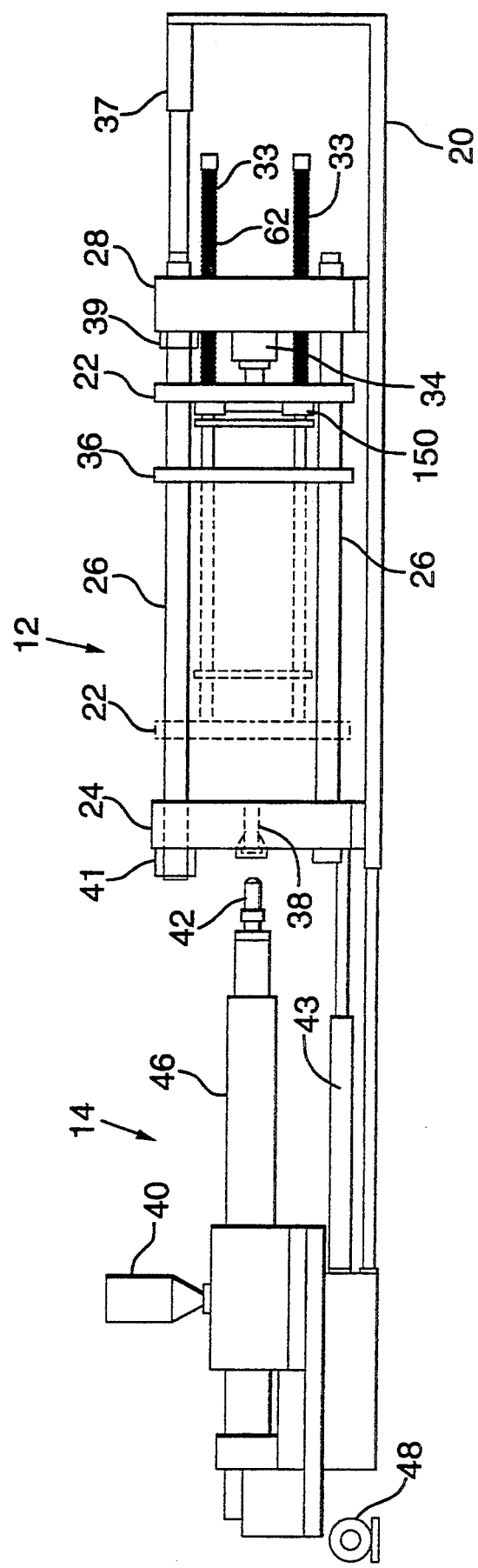
FIG. 2 is a side elevational view of a similar apparatus of the embodiment of FIG. 1.

The injection molding press embodying the present invention is generally illustrated in FIGS. 1 and 2. The apparatus generally comprises a press 12 and an injection unit 14. The molds comprised of mold section sections defining a mold cavity are mounted onto press 12. Injection unit 14 delivers a moldable material or melt to the mold cavity.

The press 12 has an elongated stationary frame section 20 and a movable frame section 22. Stationary frame section 20 has a rectangular end plate 24, a rectangular base plate 28 and four cylindrical slide rods 26 extending therebetween. Slide rods 26 are spaced in each of the four corners of the plates 24 and 28.

Movable frame section 22 has four outer bores extending at the corners thereof for slidably mounting onto slide rods 26 and four inner bores extending at the corners thereof and spaced diagonally inwardly from the outer bores. The four inner bores slidingly receive four locking rods 33 which extend from mold base 36. Mold base 36 has four bores for slidably mounting onto slide rods 26. End plate 24 has an orifice 38 for receiving nozzle 42 of the injection unit and communicating with a mold section. Optionally, end plate 24 can be provided with a plurality of orifices (see FIG. 6).

Hydraulic cylinder 34 is mounted on base plate 28 extending to moveable frame section 22 and adapted to effect reciprocal longitudinal movement of moveable frame section 22. Hydraulic cylinder 34 has a relatively short stroke and has a capacity of about 3,000 pounds of force.

Drive motor 32 is operatively connected to a pump for generating hydraulic pressure. A hydraulic system is operable connected to a hydraulic telescopic piston 35 extending between mold base 36 and moveable frame section 22 for effecting reciprocal longitudinal movement of mold base 36.

One of the upper slide rods is releasably secured to the plates 24 and 28. Hydraulic cylinder 37 is operably connected to the hydraulic system and mounted between the end of slide rod 26 and frame 20 for effecting longitudinal movement of slide rod 26. Locks 39 and 41 secure slide rod in place during use and release the slide rod for withdrawing it to provide access to the mold area. By retracting the slide rod, larger sized molds may be lifted into the mold area of the press.

Figure 3:
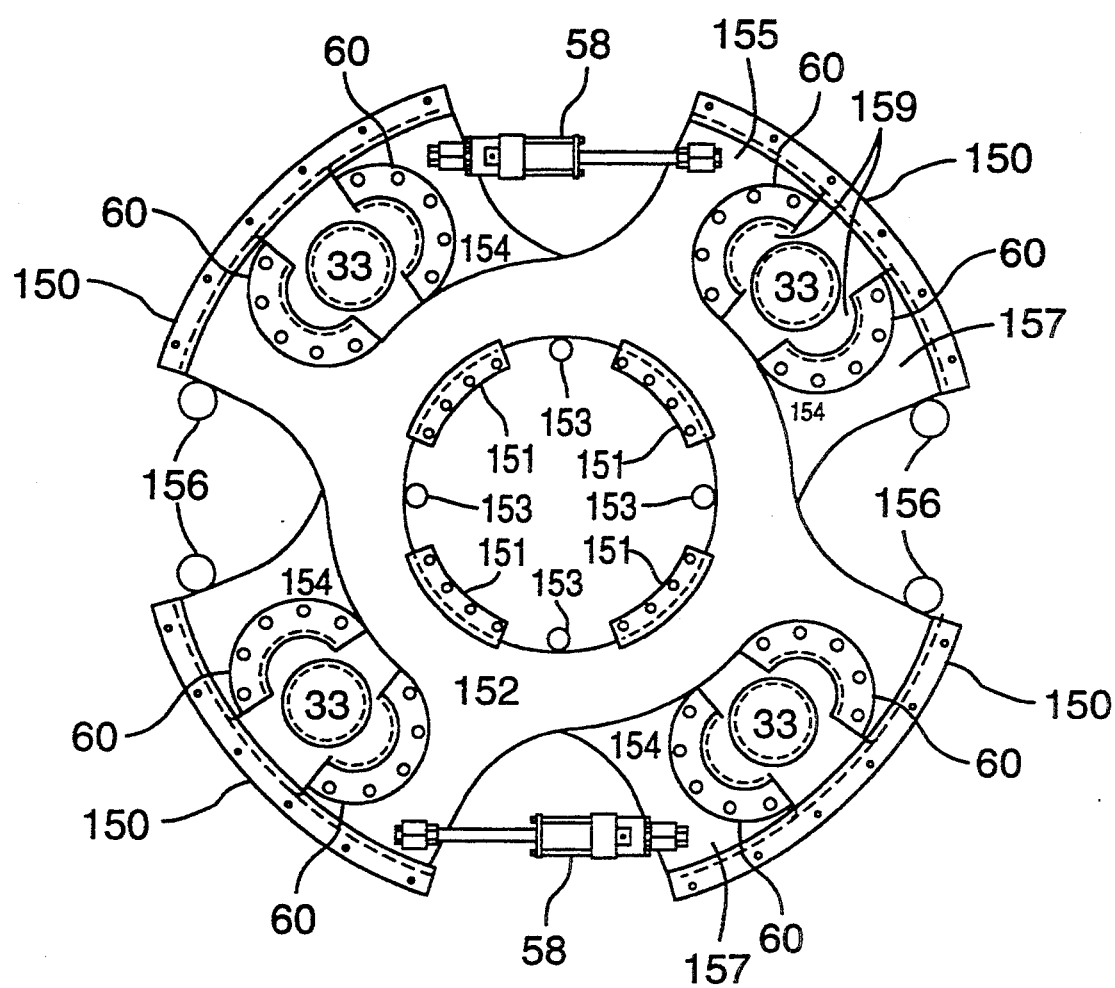
FIG. 3 is an end elevational view of the clamping device of the apparatus of FIG. 1, the clamping device in an open condition.
Figure 4:
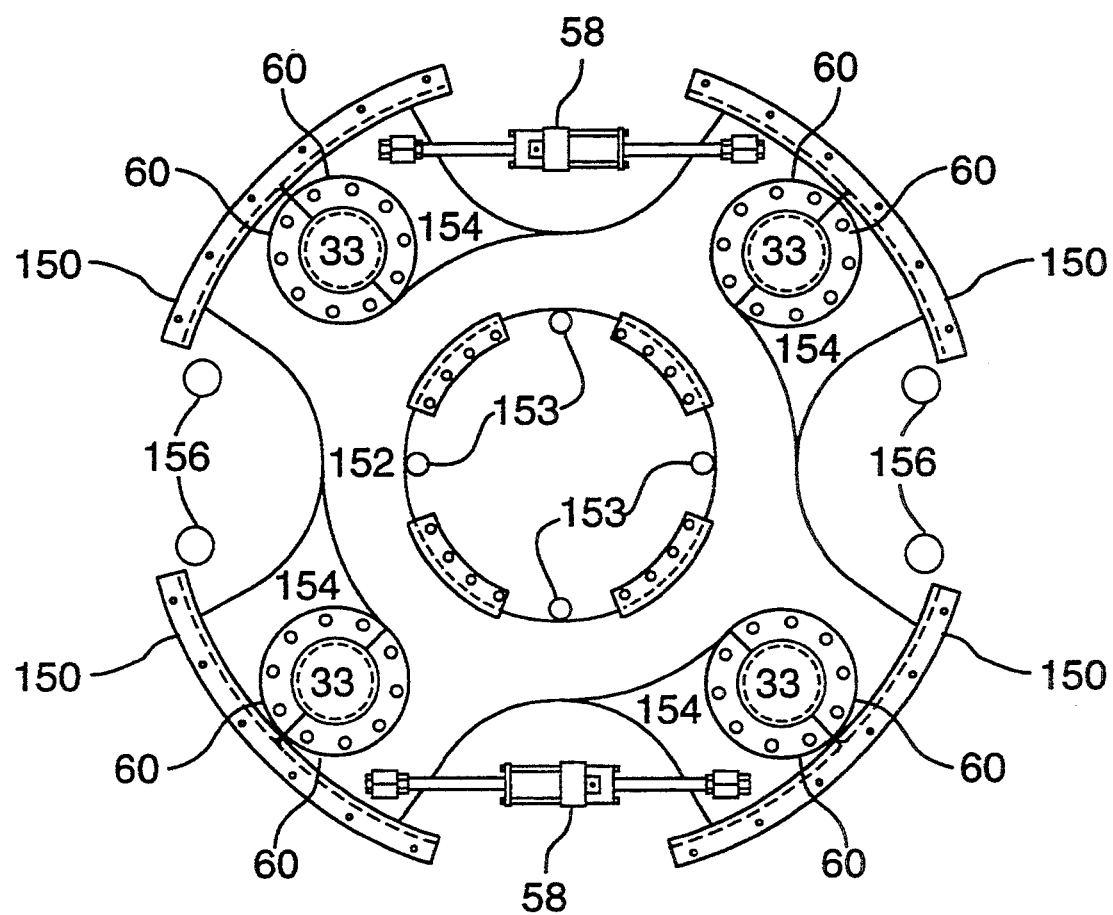
FIG. 4 is an end elevational view of the clamping device of the apparatus of FIG. 1, the clamping device in a closed condition.

Referring to FIG. 3 and 4, the face opposite the hydraulic cylinder 34 of moveable frame section 22 has a locking mechanism mounted thereon. The locking mechanism of the first embodiment uses a rotational motion to open and close. The locking mechanism comprises locking plates 152 and 154 having a central circular opening and radially extending fingers 155 and 157. The inner surface of each finger has a semi-circular cut 159. When together, the semi-circular cuts 159 define circumferentially spaced circular openings. Gib and keepers 150 and 151 are curved and spaced to slidingly receive locking plates 152 and 154 for relative rotational movement. Moveable frame section 22 has stoppers 56 for restricting the rotational movement of locking plates 152 and 154. Cam followers 153 are mounted on the base plate to assist in the rotation of locking plates 152 and 154.

Locking plates 152 and 154 are operable connected together by actuators 58. Actuators 58 can be of any known type, including hydraulic, pneumatic, solenoid, etc. Actuators are controlled by a central controller for opening and closing the locking plates in response to respective signals.

Figures 10, 11, 12, 13:
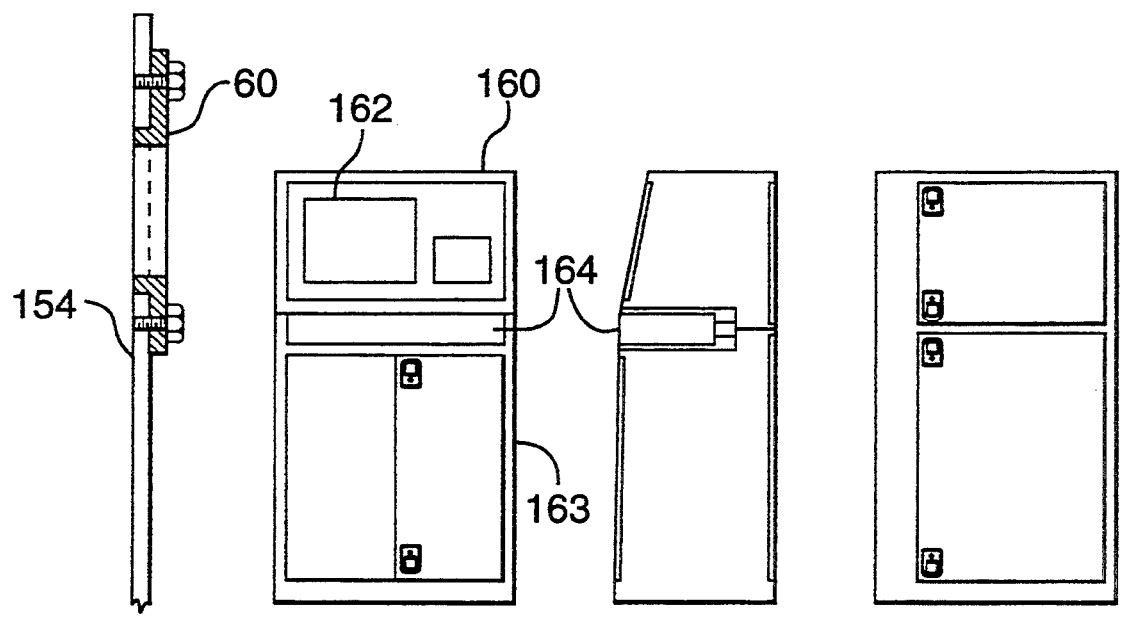
FIG. 10 is a sectional view of a clamping section of the clamping device of FIGS. 2 and 3.
FIG. 11 is a front elevational view of the control unit of the apparatus of FIG. 1.
FIG. 12 is a side sectional view of the control unit housing of FIG. 10.
FIG. 13 is a rear elevational view of the control unit of FIG. 10.

As illustrated in FIG. 10, each of the edges of the semi-circular cuts is lined with inserts 60. Insert 60 has a semi-circular rim connected to a flange. The flange is flush with the face of the locking plate while the rim extends circumferentially about the semi-circular edge. Inserts 60 are made of a hardened steel.

Locking rods 33 have a series of circumferentially extending ridges 62. Ridges 62 are sized and spaced to cooperate with the rim of inserts 60. Inserts 60 rest fully within the valleys of the ridges 62 when the locking plates are in a closed condition.

The rim of inserts 60 may fit between any of the ridges 62. Mold base 36 may be positioned at any predetermined distance from the stationary end plate 24 to accommodate any depth of mold sections without further modifications.

Injection unit 14 has a hopper 40 for receiving raw moldable material, such as a thermoset material. The moldable material is heated until fully plasticized and uniform. A screw inside of the injection unit 14 forces the melt out the injection nozzle 42. A sensor 44 is mounted within the barrel 46 of the injection unit for producing a signal proportional to the volume of melt ejected from the nozzle 42. Injection unit 14 has a drive motor 48 for generating hydraulic pressure and operable connected to a hydraulic drive system, including hydraulic cylinder 43, for effecting relative movement between the injection unit 14 and the press 12 for sealingly engaging the nozzle 42 into one of the plurality of inlet orifices 38.

Figure 5:
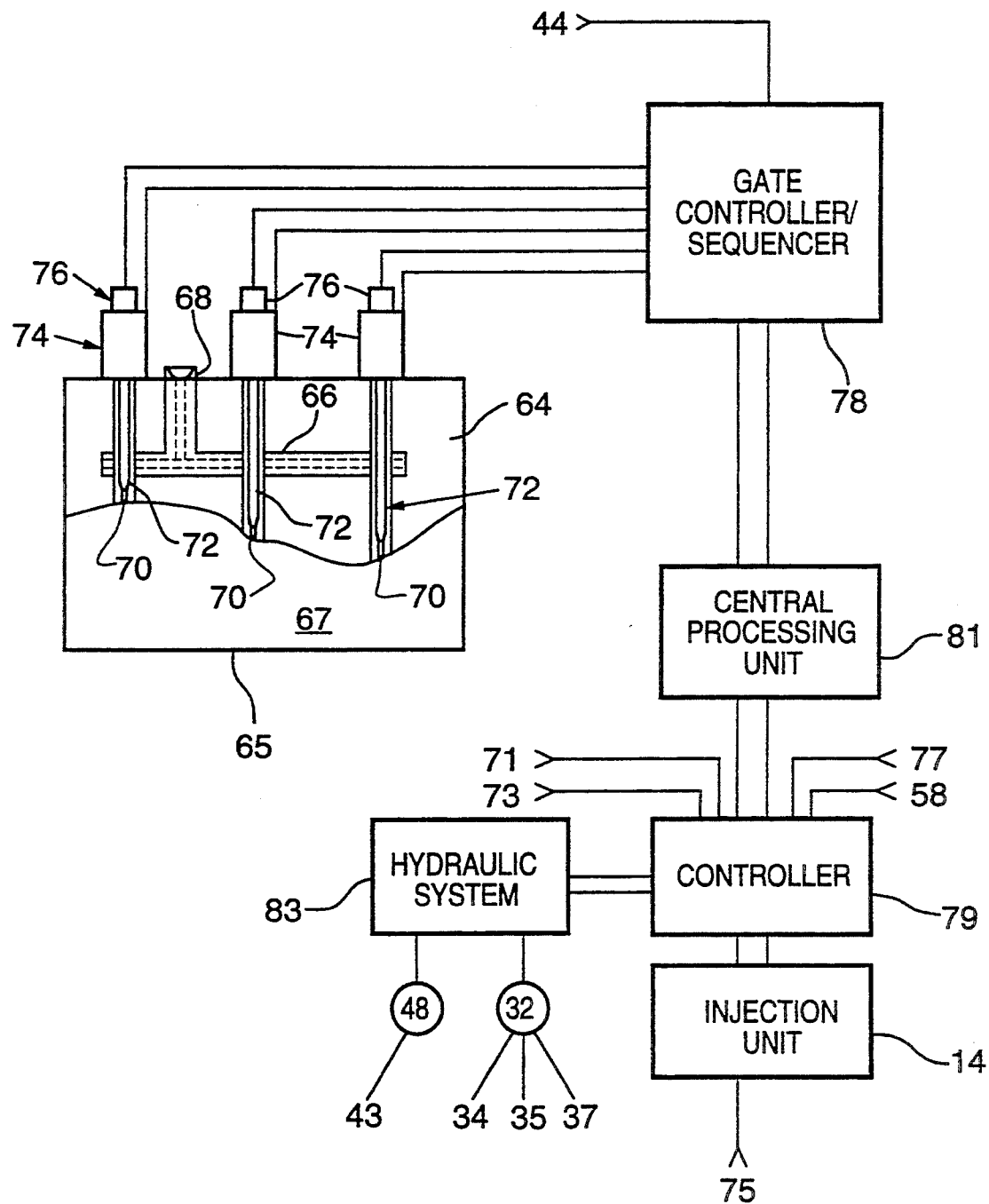
FIG. 5 is a schematic of the mold sections and gate controller/sequencer of the apparatus of FIG. 1.

Referring now to FIG. 5, the mold sections are schematically illustrated. Stationary mold section 64 is mounted onto stationary end plate 24. Moveable mold section 65 is mounted onto mold base 36. As mold section 65 is positioned relative to mold section 64, mold cavity 67 is defined. Mold sections 64 and 65 have mold surfaces which are complementary to the shape of the molded part.

Mold section 64 has a series of ports 66 extending from an inlet 68 to a plurality of injection outlets 70. In the mouth of each outlet 70 is gate 72 which controls the amount of flow of the melt through the outlets 70. Gates 72 are operatively connected to actuators 74 which move the gate relative to the outlet. Preferably, each actuator 74 has an electronic encoder 76 for generating and transmitting a signal proportional to the travel of the gate relative to the outlet. The encoder 76 is electrically connected to a gate controller/sequencer 78. The signal from displacement sensor 44 is also fed into gate controller/sequencer 78.

Mold section 64 can also have a plurality of independent ports 66 having a separate inlet. The inlets are spaced to align with one of the plurality of inlets in end plate 24. Using this feature, more complicated shapes may be molded in a single injection process.

In operation, mold sections 64 and 65 are mounted onto the respective plates 24 and 28. Mold section 64 is positioned such that inlet 68 aligns with inlet 38 of stationary end plate 24. Actuators 58 are engaged opening locking plates 152 and 154, freeing locking rods 33. Motor 32 is engaged causing drive 35 to advance base mold 35 towards stationary end plate 24 until mold sections 64 and 65 are closed defining mold cavity 67. Actuators 58 are retracted, closing locking plates 152 and 154 until the rim of inserts 60 rest fully within adjacent ridges 62 of locking rods 33, fully locking base mold 36 in position. Hydraulic cylinder 34 is engaged urging moveable frame section 22 and mold plate 36 towards end plate 24 and ultimately urging mold sections 64 and 65 together at a predetermined pressure. Drive 43 is engaged advancing injection unit 14 towards the press 12 until nozzle 42 is in sealing engagement with inlet 38.

The injection screw of the injection unit is advanced forcing the melt through the nozzle 42 into the ports 66 of mold section 64. In response to the displacement of the screw, and hence the volume of the melt injected, gate controller sequencer 78 sequentially opens and closes each of the gates allowing melt to flow sequentially through outlets 70 and into the mold cavity 67, until the melt fully occupies the cavity. By controlling the melt front, the melt lines can be controlled and minimized. At the end of the injection, gate controller sequencer 78 closes all gates. Pressure on the mold sections is maintained for a predetermined length of time, whereafter the hydraulic cylinder 34 releases reducing the pressure. Actuators 58 are activated opening locking plates 152 and 154. Moveable frame section 22 is retracted, opening mold sections 64 and 65 allowing the molded part to be extracted and the mold prepared for the next cycle.

Displacement sensor 75 is mounted on the injection unit 14 for generating a signal proportional to its position relative to the press 12. A displacement sensor 71 is mounted on the press unit to generate a signal proportional to the position of the base mold 36 relative to the end plate 24. Pressure sensor 73 is installed on the hydraulic system for cylinder 34 for signalling when the mold is under a predetermined pressure. Sensor 77 generates a signal when the locking mechanism fully engages locking bars 33. The output of each sensor is connected to a central controller 79, having a central processor 81. The controller 79 is also connected to the injection unit 14, hydraulic system 83 and motors 32 and 48 and actuators 58 for controlling the operations thereof. Several control units and control software packages are commercially available which can undertake these functions.

In retrofitting an existing apparatus, a separate control unit as illustrated in FIGS. 11, 12 and 13 may used. The controller/sequencer 78 in the form of a computer is housed with control unit 160. The controller/sequencer 78 has a screen 162 and a keyboard 164. Screen 162 can be any conventional screen or touch-sensitive screen. Keyboard 164 is installed on a retractable tray.

Figure 14:
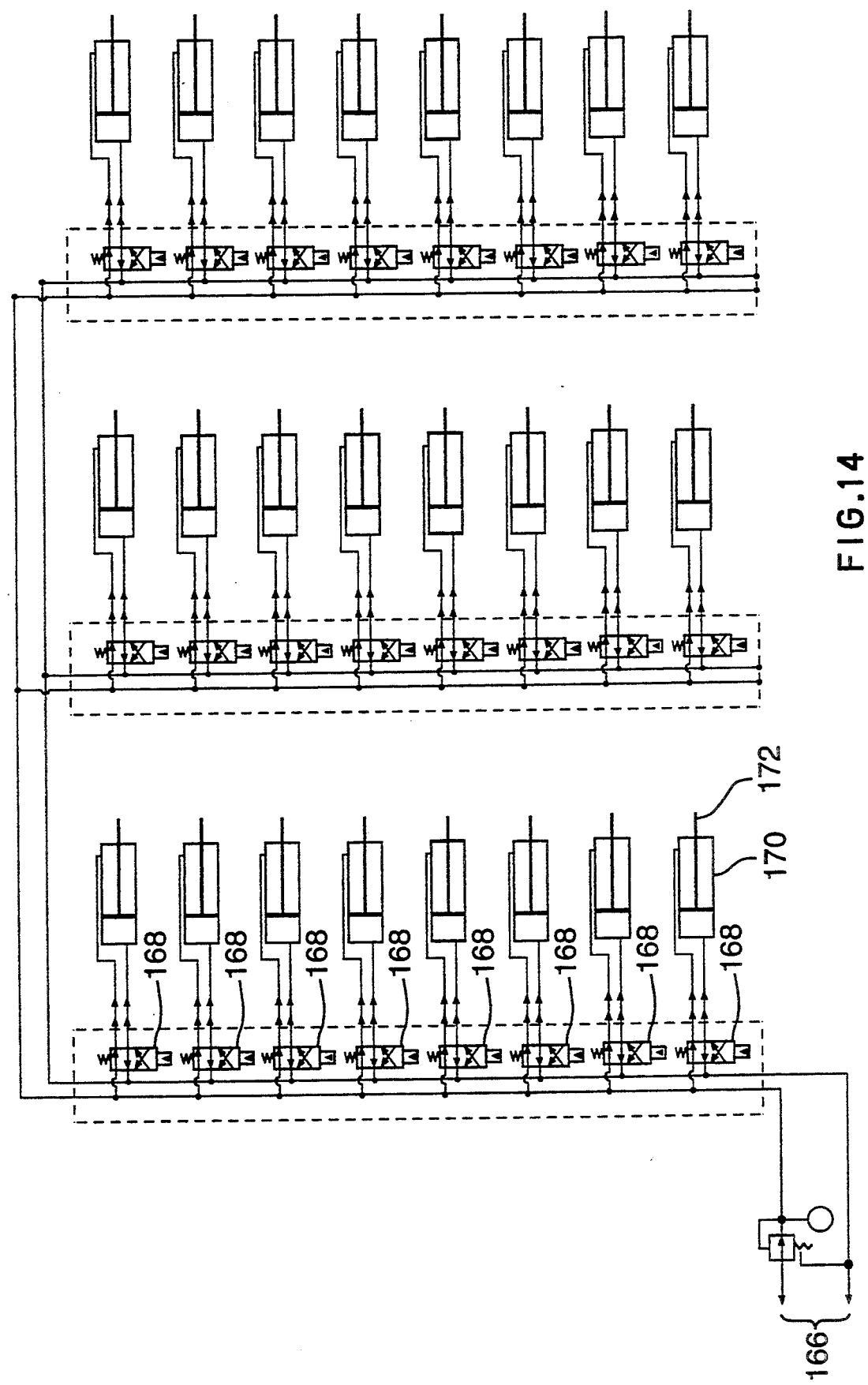
FIG. 14 is a schematic drawing of the hydraulic gate control system of the apparatus of FIG. 1.

Referring to FIG. 14, a schematic of hydraulic system is illustrated. The hydraulic valve system in the broken lined boxes are installed within housing 163. Housing 163 has a plurality of hose connections corresponding to a pair of hydraulic hoses operably connecting each actuator 74 mounted within stationary mold section 64. Actuator 74 is schematically illustrated as hydraulic cylinder 170 and plunger 172 which is connected to gate 72 for opening and closing outlet 70. Housing 163 also has a hose connection 166 for connecting the system to the hydraulic system of the press 12 and/or injection unit 14.

As is illustrated in FIG. 14, any number of hydraulic gates of a mold could be controlled. The only requirement for an existing apparatus would be to install a position transducer in the injection unit, if not already installed. Control of the gates of the mold can be controlled by the control unit 160. In the embodiment illustrated in FIG. 14, the control unit 160 need only be connected to either the hydraulic system of the press 12 or injection unit 14.

If the actuator 74 are electric, the control unit 160 need only be connected to an electrical source.

In a manner well known in the art of hydraulics, movement of plunger 172 is controlled by the application of hydraulic fluid through valve 168 to either side of hydraulic cylinder 170. Valve 168 is electrically controlled by controller/sequencer 78 to sequentially open and close the gates within the mold section.

Figure 6:
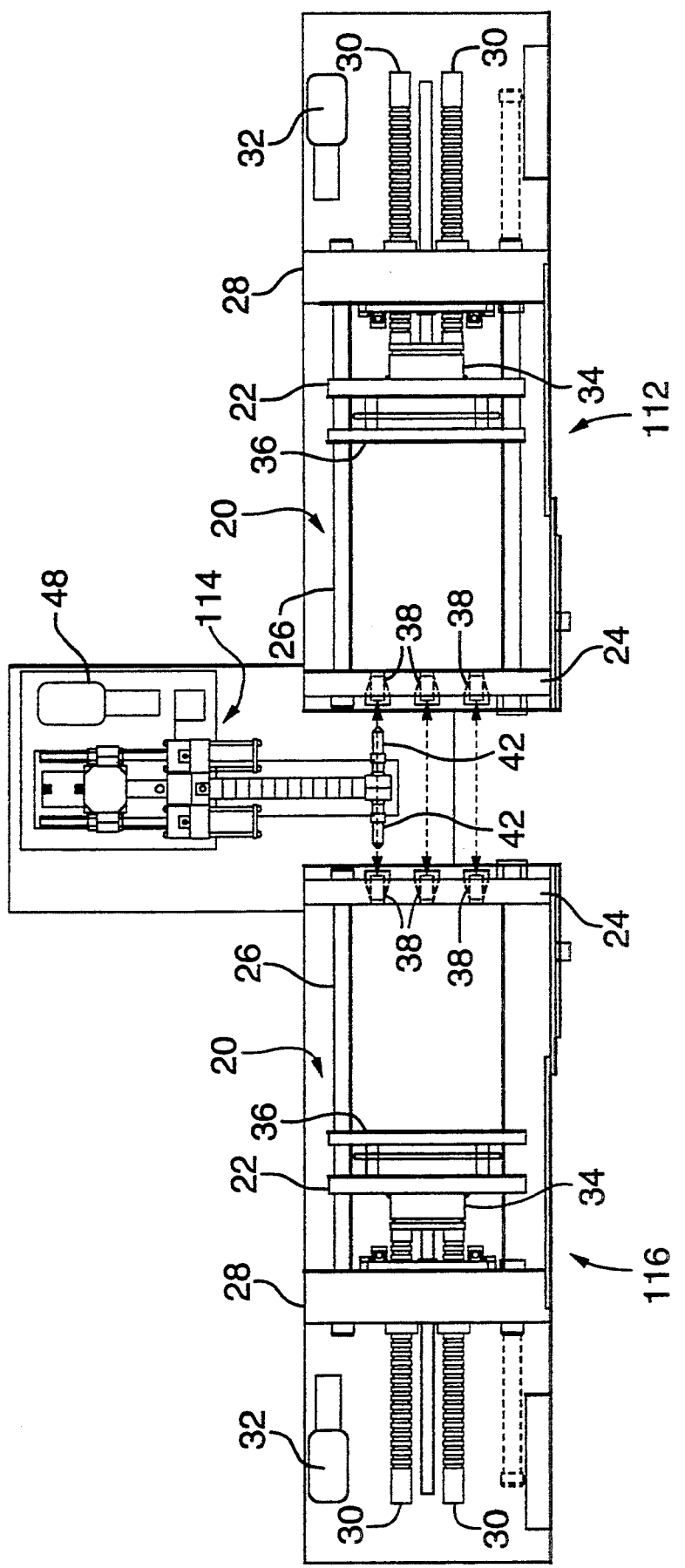
FIG. 6 is a top plan view of a second embodiment of the apparatus of the present invention.

FIGS. 6 and 7 illustrate a second and third embodiment of the invention. These embodiments are similar to the first embodiment except that the moveable frame section 22 and mold base 36 are joined together and slide as a unit. Further, the locking rods 33 are replaced by a ram or rams 30. The locking mechanism of FIGS. 3 and 4 is mounted onto the base plate 28.

Referring specifically to FIG. 6, the second embodiment of the present invention is illustrated. In this embodiment, a single injector unit 114 injects melt to one of two presses 112 and 116. Presses 112 and 116 are aligned in an end to end manner as illustrated. Presses 112 and 116 can be the same as press 12 of the first embodiment.

Figure 17:
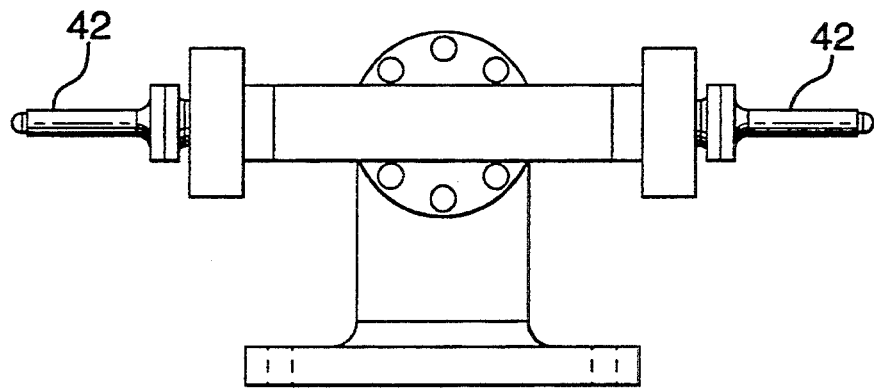
FIG. 17 is an end elevational view of the nozzle of the apparatus of FIG. 5.

Injector unit 114 is identical to injection unit 14 of the first embodiment except that the unit has a dual nozzle assembly as illustrated in FIG. 17. The single nozzle assembly is replaced by a dual nozzle assemble having two nozzles 42 extending in opposite directions. The injector unit 114 also has an internal valve for controlling the flow of melt through one or the other of the two nozzles 42.

Displacement sensors are mounted on the injection unit 114 for generating a signal proportional to its position relative to the presses 112 and 116. A displacement sensor is mounted in one of the hydraulic cylinders 35 and one in the hydraulic cylinder 34 to generate a signal proportional to the position of the moveable frame section 22 relative to the end plate 24. The output of each sensor is connected to a central control unit, having a central processor. The control unit is also connected to the injection unit 114, motors 32 and 48 and actuators 58 for controlling the operations thereof.

Referring to FIG. 7, a single ram 30 is used for effecting longitudinal travel of the moveable frame section 22. On the side opposite the hydraulic cylinder 34 is mold base 36 which is rigidly mounted to moveable frame section 22 and slidably mounted onto slide rods 26.

A locking mechanism is illustrated in FIGS. 8 and 9. Base plate 28 has a gib and keeper 50 mounted thereon. Gib and keeper 50 extend vertically on opposites of a central aperture of base plate 28 and adapted to slidingly receive locking plates 52 and 54. Base plate 28 has stoppers 56 for restricting the upward and downward movement of locking plates 52 and 54. Locking plates 52 and 54 are operably connected together by actuators 58.

Figure 15:
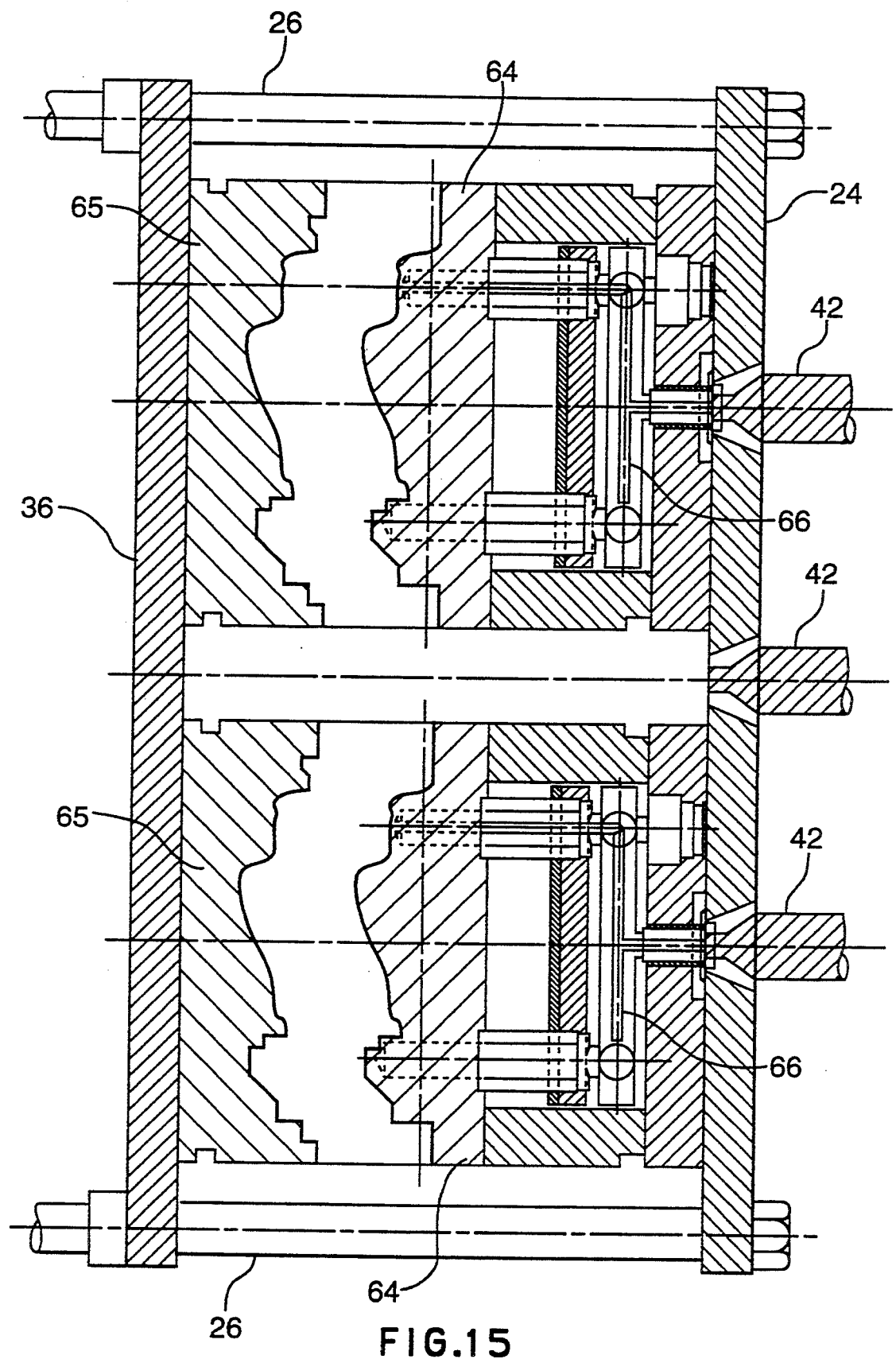
FIG. 15 is a top plan view of an open mold section of the apparatus of FIG. 1.
Figure 16:
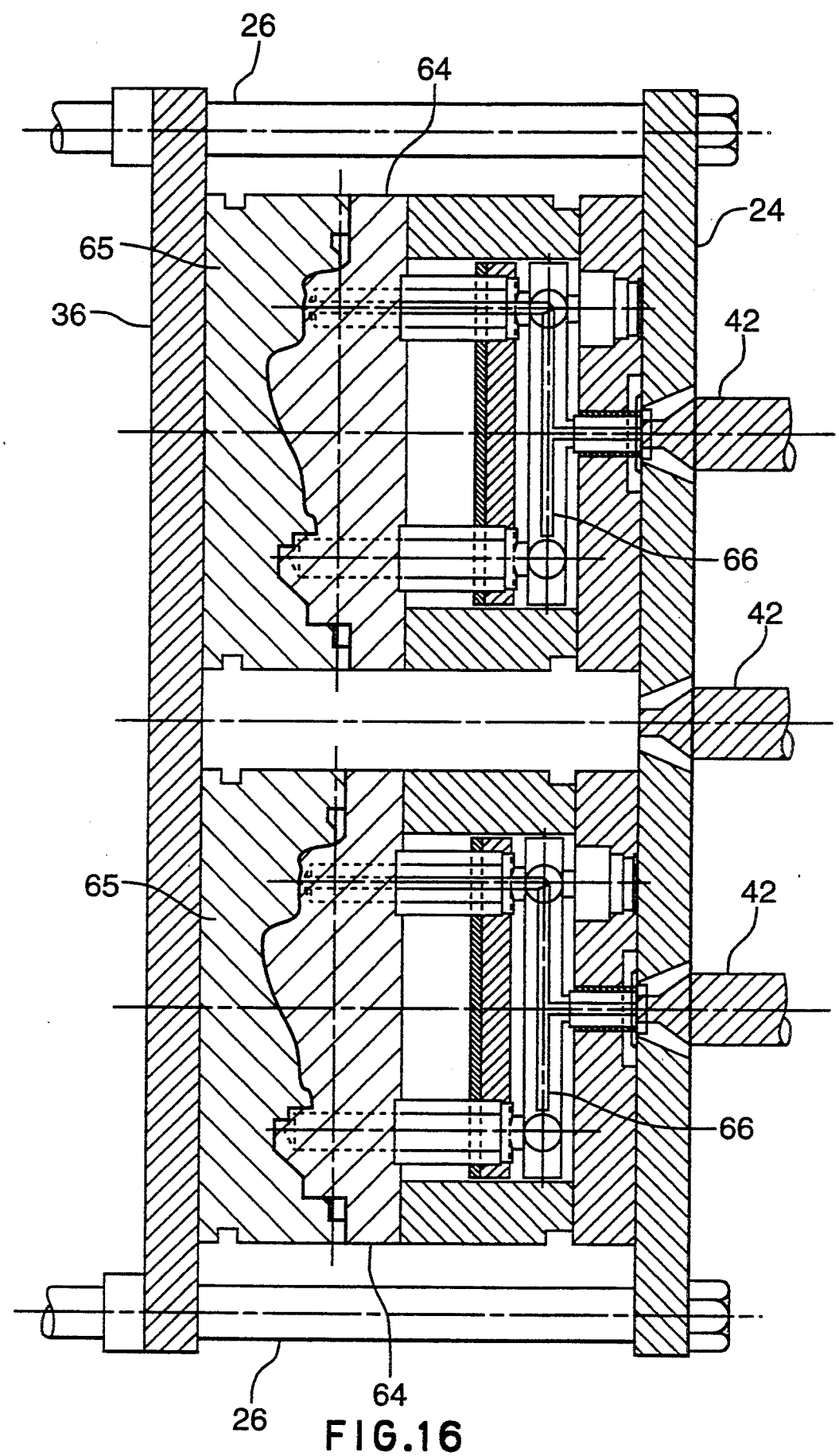
FIG. 16 is a top plan view of a closed mold section of the apparatus of FIG. 1.

Referring to FIGS. 15 and 16, another dual press arrangement is illustrated. Two separate molds are operated within a single press. As is apparent, a single press cycle will inject melt into each of the mold cavities in succession, in the manner described above. Although only two gates are illustrated, it is apparent that any number of gates may be used to inject melt into the cavity. The number, location and the sequence of opening and closing depend upon the size of the article to be molded, the physical properties of the melt, the tonnage of the press, the rate of injection, which factors are well within the purview of the ordinary skilled person in the art.

Although the disclosure describes and illustrates preferred embodiments of the invention, it is to be understood that the invention is not limited to these particular embodiments. Many variations and modifications will now occur to those skilled in the art. For a definition of the invention, reference is to be made to the appended claims.

We claim:

1. An apparatus for injection molding plastics material, the apparatus comprising:
   an injection unit for delivering a plasticized melt through a nozzle;
   a press unit for urging a mold together at a predetermined pressure;
   said mold mounted to the press unit and comprising a stationary mold section and a moveable mold section, said press unit adapted for reciprocating the moveable mold section between an open position and a closed position, said mold defining a mold cavity when said moveable mold is in said closed position, said stationary mold section having an inlet for receiving said melt, said inlet communicating with a plurality of ports at pre-selected points relative to the mold cavity, each of said ports having a controllable gate for selectively opening and closing said ports for passing said melt to the mold cavity until the melt fully occupies the mold cavity while controlling and minimizing melt lines formed when a flow from one of said ports meets with a flow of melt from another of said ports; and
   a programmable control means operably connected to the injection unit and the press unit for automatically controlling the operation of the apparatus for repetitively producing uniform articles;
   wherein said press unit comprises
   an elongated stationary frame having an end plate and a base plate and slide rods extending therebetween, said end plate having said stationary mold section mounted thereon, the end plate having at least one orifice adapted to sealingly receive the nozzle and communicate with said inlet of said stationary mold section,
   a moveable frame slidably mounted on the slide rods for reciprocal movement between the end plate and the base plate, the moveable frame having a first drive means mounted between said base plate and the moveable plate for effecting the reciprocal movement therebetween,
   a base mold section slidably mounted on the slide rods for reciprocal movement between the end plate and the moveable frame, said base mold section having said moveable mold section mounted thereon, said base mold section having a second drive means mounted between the moveable frame and the base mold section for effecting the reciprocal movement therebetween, said base mold section having a plurality of locking bars adapted to engage said moveable frame, said moveable frame having locking means for releasably securing said locking bars when the moveable mold section is in the closed position, wherein one of said first and second drive means positions said moveable mold section in the closed position and the other of said first and second drive means urges the mold sections together at said predetermined pressure.

2. An apparatus as claimed in claim 1 wherein said locking means is mounted on a face of the moveable frame and comprises
   a first and second locking member slidably mounted on the face of the moveable frame, the first and second locking members adapted to cooperatively engage the locking bars, an actuator means connected between the first and second locking members for sliding the members relative to each other opening and closing the locking members.

3. An apparatus as claimed in claim 2 wherein said first drive means is an extensible hydraulic cylinder and said second drive means is a short stroke hydraulic cylinder.

4. An apparatus as claimed in claim 3 wherein said locking bars have a plurality of circumferentially extending ridges for receiving said first and second locking members.

5. An apparatus as claimed in claim 4 wherein said moveable frame has a plurality of bores adapted to allow said locking bars to extend therethrough.

6. An apparatus as claimed in claim 5 wherein said apparatus has four locking bars and four slide rods rectangularly spaced.

7. An apparatus as claimed in claim 1 wherein said programmable control means comprises
   a first sensor means mounted in the injection unit for generating a first signal proportional the volume of the plasticized melt being delivered,
   a plurality of second sensor means for generating a plurality of second signals, each second sensor means mounted in each of said controllable gates, each second signal being proportional to a degree of opening of the respective controllable gate,
   said programmable control means being responsive to the first and second signals and operably connected to said controllable gates for opening and closing said ports at a predetermined sequence.

8. An apparatus as claimed in claim 7 wherein each of said controllable gates comprises a plunger mounted within each of said ports for reciprocating movement therein and a gate drive means for effecting said reciprocating movement.

9. An apparatus as claimed in claim 8 wherein said gate drive means is hydraulic.

10. An apparatus as claimed in claim 8 wherein said gate drive means is electric.

11. An apparatus as claimed in claim 8 wherein said gate drive means and said programmable control means are housed in a housing separate from the apparatus.

12. An apparatus as claimed in claim 1 wherein said apparatus further comprises a third drive means for moving said injection unit relative to the press unit for sealingly engaging said nozzle with said orifice.

13. An apparatus as claimed in claim 12 wherein said press unit further comprises a fourth drive means operably connected to one of said slide rods, said one of said slide rods releasably secured to said end plate and base plate, whereby upon releasing said one of said slide rods said fourth drive means retracts said one of said slide rods for accessing an area where said mold is mountable in said press unit.

14. An apparatus as claimed in claim 13 wherein each of said drive means are operably connected to said programmable control means.

15. An apparatus as claimed in claim 14 wherein each of said drive means are hydraulic.

16. An apparatus as claimed in claim 15 wherein each of said drive means includes a pumping means for generating hydraulic pressure for energizing each of said drive means and said pumping means is operably connected to said programmable control means.

17. An apparatus as claimed in claim 16 wherein said pumping means includes a press pump for effecting operations of said press unit and an injection pump for effecting operations of the injection unit.

18. An apparatus as claimed in claim 7 wherein said press unit further comprises a third sensor means mounted on said press unit for sensing the displacement of the moveable mold with respect to the stationary mold section and generating a third signal when said moveable mold is in said closed position and said programmable control means is responsive to said third signal for initiating said injection unit to deliver said plasticized melt.

19. An apparatus as claimed in claim 18 wherein said programmable control means is operably connected to the first and second drive means, the first and second sensor means, the control means programmable for periodically moving the moveable mold section to the closed position, responsive to the third signal locking the locking bars locking the moveable mold section in the closed position, energizing the one of the first and second drive means urging the mold together at a predetermined pressure, responsive to the first and second signals injecting a predetermined amount of melt into the mold cavity through said ports, waiting a predetermined time period, deenergizing said one of said first and second drive means, unlocking the locking means, moving the moveable mold section to the open position for extracting a molded article therefrom.

* * * * *